(12) United States Patent
Pisharody

(10) Patent No.: US 8,121,110 B2
(45) Date of Patent: Feb. 21, 2012

(54) METHOD AND APPARATUS FOR LOCATIONING AN OBJECT IN A COMMUNICATION NETWORK

(75) Inventor: Mohan Pisharody, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 634 days.

(21) Appl. No.: 12/270,319

(22) Filed: Nov. 13, 2008

(65) Prior Publication Data

US 2010/0118858 A1 May 13, 2010

(51) Int. Cl.
    *H04J 3/24* (2006.01)
(52) U.S. Cl. .................................................... 370/349
(58) Field of Classification Search .......... 455/456.2, 455/456.5, 456.6, 456.1, 456.3; 370/350, 370/324, 509, 503, 349
    See application file for complete search history.

(56) References Cited

U.S. PATENT DOCUMENTS

| 6,975,618 | B1 * | 12/2005 | Smith et al. | 370/350 |
| 2002/0183069 | A1 * | 12/2002 | Myr | 455/456 |
| 2003/0078045 | A1 * | 4/2003 | Norstrom et al. | 455/436 |
| 2003/0134648 | A1 * | 7/2003 | Reed et al. | 455/456 |

* cited by examiner

*Primary Examiner* — Melody Mehrpour

(57) ABSTRACT

A method and apparatus for locationing an object in a communication network. The method includes transmitting by a wireless transceiver fixed to the object of unknown location a plurality of radio frequency (RF) packets to a plurality of locationing receivers (LRs) in the communication network. The method further includes determining by each locationing receiver the local time of arrival of the RF packet and places a time stamp on the received RF packet based on a corresponding local clock, wherein the local clocks of the locationing receivers are synchronized based on a plurality of RF beacon packets transmitted by at least one reference transmitter at a known location.

7 Claims, 4 Drawing Sheets

METHOD AND APPARATUS FOR LOCATIONING AN OBJECT IN A COMMUNICATION NETWORK

FIELD OF THE DISCLOSURE

The present disclosure relates generally to communication network and more particularly to locationing an object in a communication network.

BACKGROUND

In recent years, an exponential growth of communication systems especially wireless communication systems has been observed. At first, the great success of wireless communication systems is essentially explained by the mobility they enable. Mobility is, by nature, coupled with uncertainty. However, uncertainty is often not desired in applications like industrial manufacturing, network organization, and many other applications. Local positioning or locationing is the only means to efficiently overcome this uncertainty. Security and integrity also benefit strongly from locationing. Hence, there is a well-established demand for the ability to track the location of various objects and/or persons within a wireless communication system or network.

Locating a device in a wireless communication network may be accomplished by measuring the differences in arrival times of radio frequency (RF) packets at three or more spatially separated receivers or locationing receivers (LRs), even without the knowledge of the time of transmit. The most difficult task to accomplish in this scheme, is the synchronization of time-stamping clocks among all the LRs. Traditionally, this is achieved by a variety of hardware methods such as distributing a highly stable clock via coax, or, over the air via RF broadcast. However, this involves a lot of cost.

Accordingly, there is a need for a method and apparatus for locationing an object in a communication network

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
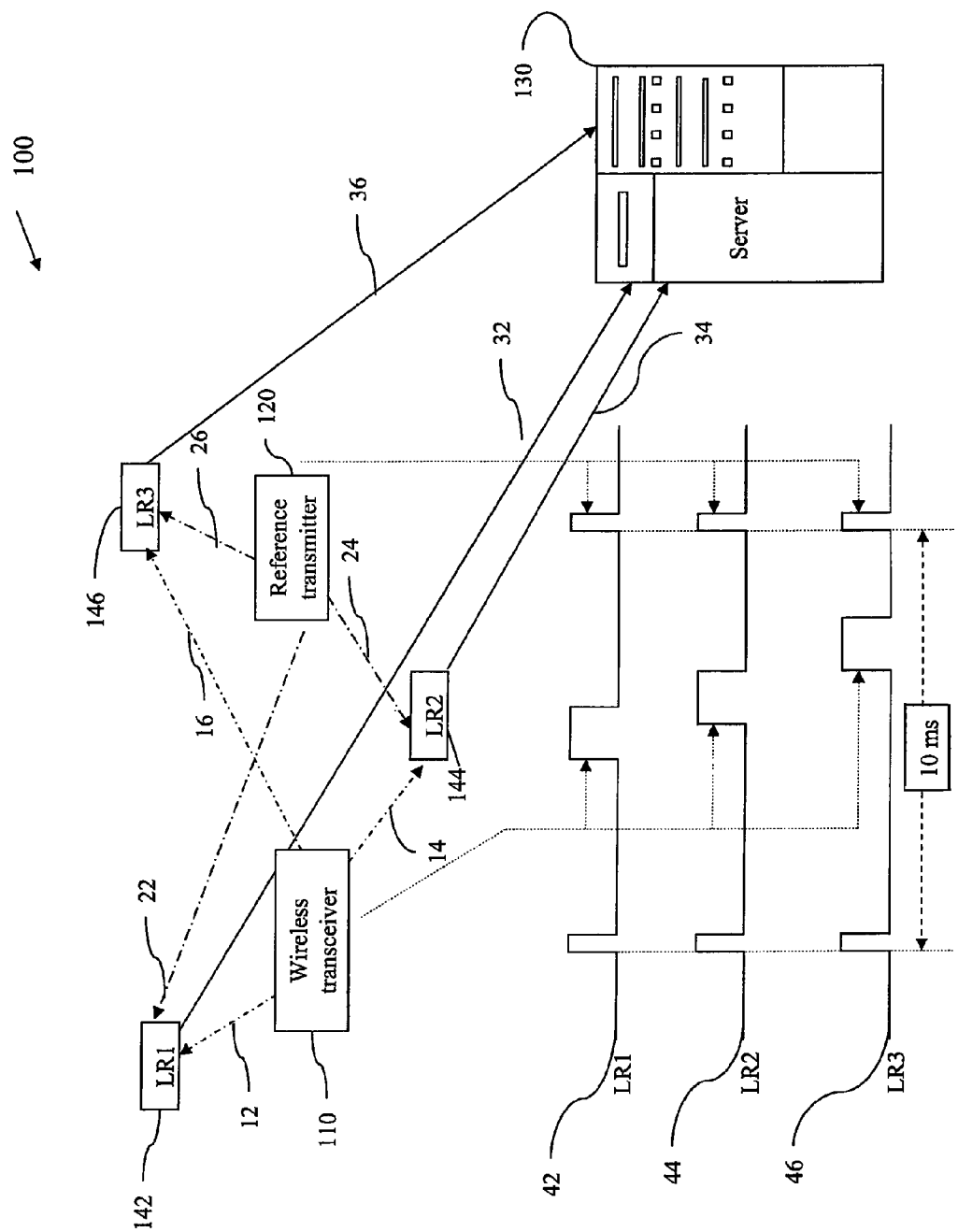
FIG. 1 is a block diagram of the communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments, a method and device for locationing an object in a communication network is shown. Accordingly, a wireless transceiver fixed to the object of unknown location transmits a plurality of radio frequency (RF) packets to a plurality of locationing receivers (LRs) in the communication network. Each locationing receiver determines the local time of arrival of the RF packet and places a time stamp on the received RF packet based on a corresponding local clock, wherein the local clocks of the locationing receivers are synchronized based on a plurality of RF beacon packets transmitted by at least one reference transmitter at a known location. Advantages of the various embodiments include: decreasing the cost associated with using a single highly accurate stable clock. Those skilled in the art will realize that the above recognized advantages and other advantages described herein are merely illustrative and are not meant to be a complete rendering of all of the advantages of the various embodiments.

Referring now to the figures, FIG. 1 is a block diagram of a communication network 100 in accordance with some embodiments. Communication network 100 includes a wireless transceiver 110 fixed to an object at an unknown location, a reference transmitter 120 fixed to a reference object at a known spatial location, a locationing server (referred herein as server) 130, and a plurality of locationing receivers (LRs) 142, 144, and 146 fixed at known spatial locations. The communication network 100 may comprise, but not limited to, wireless local area networks (WLANs) in accordance with various standards such as, but not limited to, 802.11a, 802.11b, and 802.11g. Accordingly, reference to the WLAN standards used herein includes the standards mentioned above as well as subsequent revisions to the standards.

The teachings herein, however, are not limited to WLAN networks but can be applied to other types of networks that comprise a transceiver fixed to an object in an unknown location. Such networks may include, for example, Wi-Fi or Worldwide Interoperability for Microwave Access (WiMax) networks. In addition, only a single wireless transceiver, a single reference transmitter, a single server, and three LRs are shown for ease of illustration. However, the teachings herein can be implemented within a system comprising additional wireless transceivers, reference transmitters, severs, and LRs.

Returning again to the network 100, the wireless transceiver 110 and the reference transmitter 120 are at least equipped with a transmitter and receiver apparatus (not shown) and an antenna (not shown) and is further equipped with any additional components as needed for a commercial embodiment. The transmitter and receiver apparatus and the antenna can have any suitable physical implementation and are topologically coupled depending on the particular device implementation. These components are further operatively coupled and can be adapted, arranged, configured, and designed to perform methods in accordance with the teachings herein.

The plurality of LRs 142, 144, and 146 are also equipped with a transmitter and receiver apparatus (not shown) and an antenna (not shown). In addition, each LR 142, 144, and 146 includes a local clock (not shown) for providing timing information and thereby time stamp each received RF packet or RF beacon packet. The transmitter and receiver apparatus, the antenna, and the local clock are operatively coupled and adapted, arranged, configured and designed to carry out their functionality, including any functionality needed to implement the teachings herein, for example, as illustratively described with reference to FIG. 2.

Further, if the communication link between the server 130 and each LR is a wireless link, the server 130 is also equipped with an antenna (not shown) and a transmitter and receiver apparatus (not shown). In addition, the server 130 includes a memory (not shown), a processor (not shown), and other additional components as needed for a commercial embodiment. The antenna, transmitter and receiver apparatus, memory and the processor can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining FIGS. 3 and 4.

As used herein, the server 130 is an infrastructure device that can receive information (e.g. lists of time stamped RF packets and RF beacon packets) in a wired or wireless links 32, 34, and 36 from a plurality of LRs 142, 144, and 146 and process the received information.

As referred to herein, the wireless transceiver 110 includes, but is not limited to, devices commonly referred to as mobile radios, mobile stations, subscriber units, user equipment, mobile devices, or any other device capable of operating in a wireless environment. Examples of wireless transceiver 110 include, but are not limited to, two-way radios, mobile phones, cellular phones, Personal Digital Assistants (PDAs), laptops and pagers. The reference transmitter 120 includes a device fixed at a known location such as, but not limited to, a wireless radio transmitter. The wireless radio transmitter transmits periodically, a plurality of RF beacon packets.

Referring again to FIG. 1, communication links or channels 12, 14, 16, 22, 24, 26, 32, 34, and 36 comprise the physical communication resources over which information is sent between the elements within the network 100. Communication links 12, 14, 16, 22, 24, and 26 can be wireless broadcast or multicast links. In one example, as illustrated in FIG. 1 the wireless transceiver 110 transmits by broadcasting or multicasting a plurality of RF packets to the plurality of LRs 142, 144, and 146 through the communication links 12, 14, and 16, respectively. The reference transmitter 120 transmits by broadcasting or multicasting a plurality of RF beacon packets to the plurality of LRs 142, 144, and 146 through a plurality of communication links 22, 24, and 26, respectively, wherein the plurality of RF beacon packets are transmitted during specific time intervals such that the time interval is shorter than a minimal time interval necessary for correcting the drift time of the local clocks in the LRs. In one example, as illustrated in FIG. 1, the time interval can be 10 milliseconds (ms). The period in which each LR 142, 144, or 146 receives the RF packet and the RF beacon packet is shown in the sample timing wave forms 42, 44, and 46, respectively. The timing waveforms 42, 44, and 46 shown in FIG. 1 is for the purpose of illustration only and can be any waveform depending on other factors such as, but not limited to, the time at which RF packets and the RF beacon packets are received by the LR (e.g. one of 142, 144, and 146), the number of reference transmitters, the time interval between two RF beacon packets, etc,. Further, the LRs 142, 144, and 146 transmits the RF packets received from the wireless transceiver 110 and the RF beacon packets received from the reference transmitter 120 to the server 130 through the communication links 32, 34, and 36, respectively. In addition, transmission of each RF packet and RF beacon packet from LRs 142, 144, and 146 to the server 130 further includes transmitting a packet identifier number and time stamp information.

Figure 2:
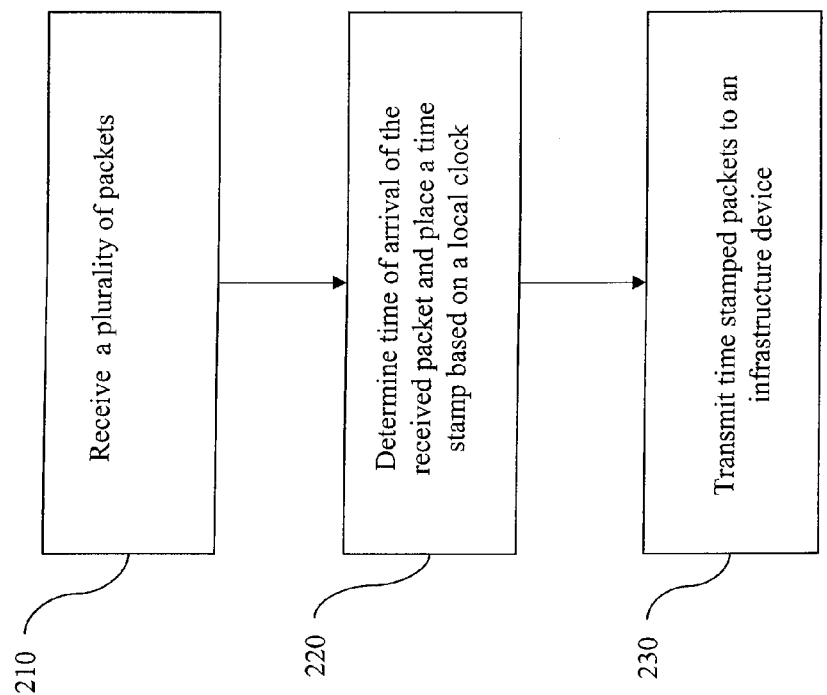
FIG. 2 is a flowchart of a method performed in a LR in accordance with some embodiments.

FIG. 2 is a flowchart of a method performed in a LR in accordance with some embodiments. The method 200 includes receiving by the LR (e.g. one of 142, 144, and 146) a plurality of packets 210, wherein the plurality of packets can be a plurality of RF packets from the wireless transceiver 110 or a plurality of RF beacon packets from the reference transmitter 120. Further, the RF beacon packets are transmitted from the reference transmitter 120 at specific time intervals, for example about 10 ms, such that the time interval is shorter than a minimal time interval necessary for correcting the drift time of the local clocks in the LRs. In one implementation, the minimal time interval necessary to correct the drift time of the local clocks can be determined based on lab measurements on drift time of standard 20 parts per million (ppm) crystals. Over a 1 second interval, the drift time of the standard 20 ppm crystal was observed to be approximately ±50 parts per billion (ppb). That is, for a minimal time interval of 1 second, the uncertainty in time measurement is ~50 nanoseconds (ns), assuming a 1 GHz local clock frequency. Therefore, if the minimal time interval is reduced to 10 ms, the uncertainty in time measurement could potentially be reduced to 0.5 ns. This corresponds to a location uncertainty of 0.5 feet.

The method 200 further includes determining by the LR (e.g. one of 142, 144, or 146) the time of arrival of each RF packet or each RF beacon packet and placing a time stamp 220 on each of the received signal based on a local clock present in the LR 142, 144, or 146 and transmitting 230 the time stamped RF packets and the time stamped RF beacon packets to the server 130. In addition, transmission of each RF packet and the RF beacon packet from LRs 142, 144, and 146 to the server 130 further includes transmitting a packet identifier number and time stamp information. The local clocks present in each one of the plurality of LRs 142, 144, and 146 are synchronized based on the plurality of RF beacon packets transmitted by the reference transmitter 120. Further, transmitting 230 the time stamped RF packets and the time stamped RF beacon packets by the LR 142, 144, or 146 to the server 130 includes communicating periodically a list of time stamped RF packets and a list of time stamped RF beacon packets that are received by the LR 142, 144, or 146 till a particular instant of time.

Figure 3:
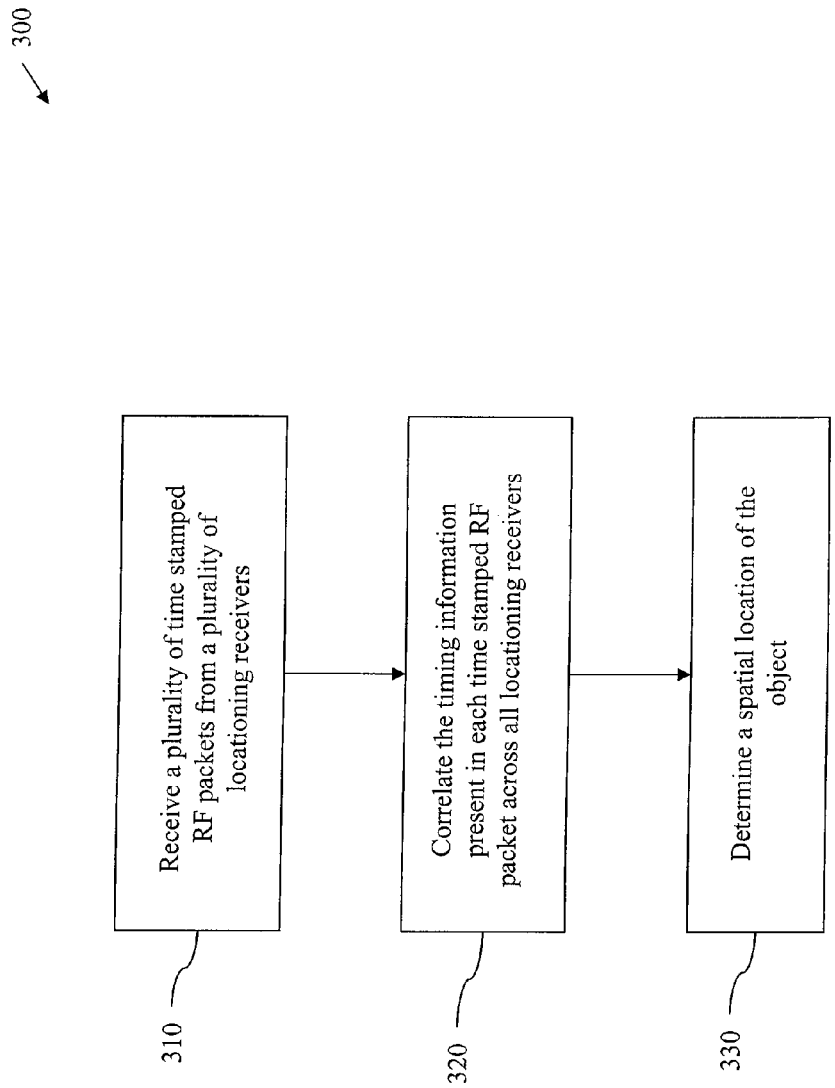
FIG. 3 is a flowchart of a method performed in a locationing server in accordance with an embodiment of the present invention based on a first data set.

FIG. 3 is a flowchart of a method performed in a locationing server in accordance with an embodiment of the present invention based on a first data set. The method 300 includes receiving by the server 130 a plurality of time stamped RF packets from the plurality of LRs 142, 144, and 146, placed at known locations. Each time stamped RF packet received from the plurality of LRs 142, 144, or 146 includes the time of arrival of an RF packet at a particular LR 142, 144, and 146, wherein the RF packets are transmitted to the LRs 142, 144, and 146 by the wireless transceiver 110. In addition, each RF packet also includes a packet identifier number, wherein the packet identifier number is used by the server 130 to uniquely correlate each RF packet as being received by a corresponding LR 142, 144, and 146.

The method 300 further includes correlating the timing information 320 present in each RF packet across all LRs 142, 144, and 146 and determining the spatial location of the object 330 using a differential time-of-arrival triangulation method. The differential time-of-arrival triangulation method is well known in the art and is described as follows: For a given pair of LRs receiving the same RF packet, the server calculates the difference in the time of arrival. This time difference (multiplied by the speed of light), is the difference in the straight-line distance from the transmit point, to each of the LR. The set of points that satisfy this relation lie on a hyperbola whose two foci are the two LRs. If a third LR also receives and times the same RF packet, a total of three LR pairings will yield three intersecting hyperbolas and the shared intersection of the three hyperbolic loci will define the spatial location of the object.

Referring back to the method 300, correlating the timing information 320 present in each RF packet across all LRs 142, 144, and 146 further includes synchronizing the local clocks of the plurality of LRs 124, 144, and 146 based on a cross calibration with at least one reference transmitter 120 at a known location. The method of synchronizing is described in detail with reference to FIG. 4 as mentioned below.

Figure 4:
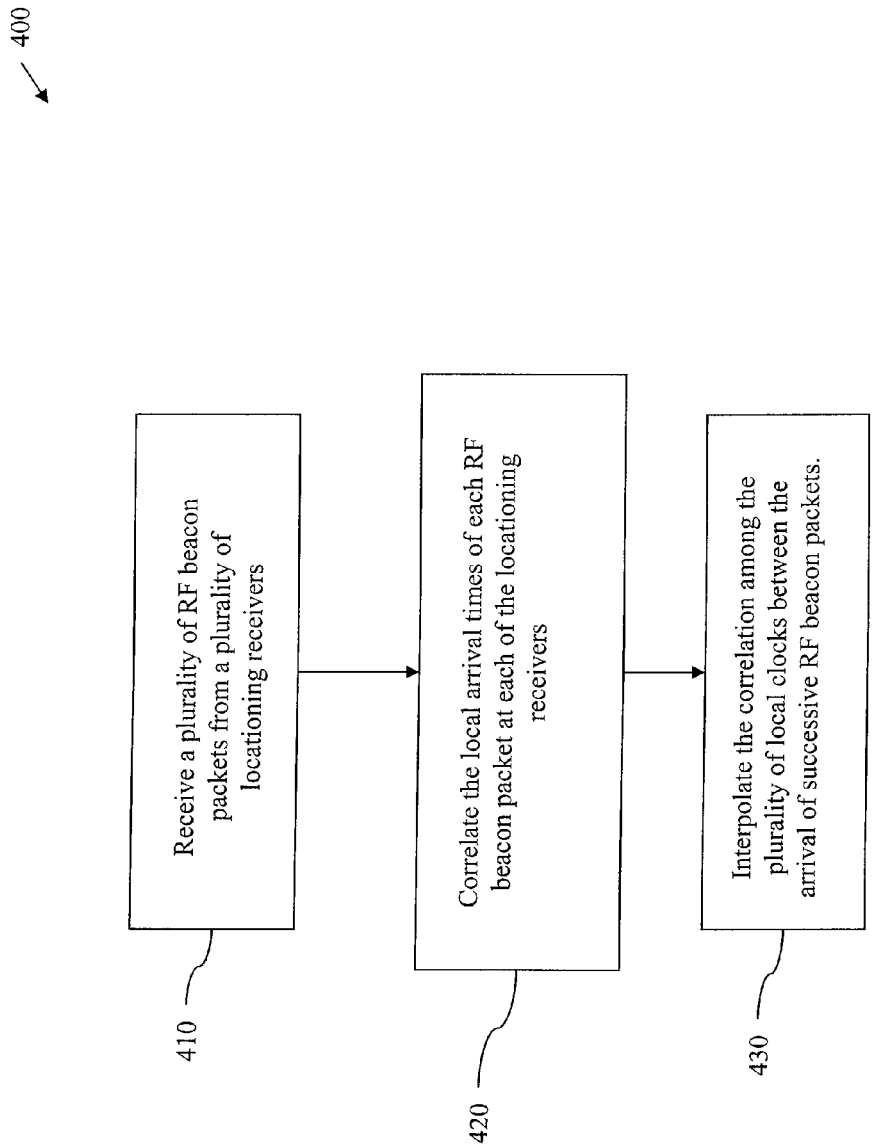
FIG. 4 is a flowchart of a method performed in a locationing server in accordance with an embodiment of the present invention based on a second data set.

FIG. 4 is a flowchart of a method performed in a locationing server in accordance with an embodiment of the present invention based on a second data set. The method 400 includes receiving by the server 130 a plurality of time stamped RF beacon packets 410 from a plurality of LRs 142, 144, and 146, placed at known locations. Each time stamped RF beacon packet received from the plurality of LRs 142, 144, or 146 includes the time of arrival of the RF beacon packet at a particular LR 142, 144, and 146, wherein the RF beacon packets are transmitted to the LRs 142, 144, and 146 by the reference transmitter 120 at a known location at specific time intervals. In addition, each RF beacon packet also includes a packet identifier number, wherein the packet identifier number is used by the server 130 to uniquely correlate each RF beacon packet as being received by a corresponding LR 142, 144, or 146.

The method 400 further includes correlating the local arrival times 420 of each RF beacon packet at each of the LRs 142, 144, or 146 based on the known spatial location of the reference transmitter 120 and LRs 142, 144, and 146 and interpolating the correlation 430 among the plurality of local clocks between the arrival of successive RF beacon packets. Correlating the local arrival times 420 of each RF beacon packet is achieved by placing the LRs 142, 144, and 146 and the reference transmitter 120 at known locations. In one example of the embodiment the LRs 142, 144, and 146 are placed at equal distance from the reference transmitter 120, such that at any instant of time each LR 142, 144, and 146 receives the RF beacon packet from the reference transmitter 120, at the same time instant. Upon receiving the RF beacon packet, each LR 142, 144, and 146 places a time stamp on the received RF beacon packet based on its local clock. The time stamp on each RF beacon packet corresponding to each LR 142, 144, and 146 at any particular time instant is not numerically identical since the local clocks of the LRs 142, 144, and 146 are not synchronized. However, with the known location of the LRs 142, 144, and 146, the time stamp on each RF packet corresponding to each LR 142, 144, and 146 can be equated to a value corresponding to the local clock of one of the LRs 142, 144, or 146. The local clocks of the other LRs 142, 144, or 146 can be equated to this value. Hence, the local clocks of the LRs are correlated. In practice, the local clocks all experience a drift in time with respect to each other and therefore the correlation may not be the same each time. This can be solved by periodically transmitting the RF beacon packets and thereby providing a fresh correlation of the local clocks.

In one implementation, linear interpolation techniques are used to interpolate the correlation 430 among the plurality of local clocks between the arrivals of successive RF beacon packets, based on clock values calculated at the RF beacon packet arrival instants. Method 400 is performed over the specific intervals of time the RF beacon packets are transmitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for locationing an object in a communication network, the method comprising:
    transmitting by a wireless transceiver fixed to the object of unknown location, a radio frequency (RF) packet, to a plurality of locationing transceivers at known locations in the communication network;
    determining by each of the plurality of locationing transceivers, the local time of arrival of the RF packet;
    placing, by each of the plurality of locationing transceivers, a time stamp on the received RF packet based on the local time of arrival and a local clock of each of the plurality of locationing transceivers along with a packet identifier number,;
    communicating by each of the plurality of locationing transceivers to an infrastructure device a list of time stamped and identified RF packets received by the identified locationing transceivers;
    correlating the time stamps for each identified RF packet across all locationing transceivers; and
    determining a spatial location of the object using a differential time-of-arrival triangulation.

2. The method of claim 1 further comprising:
    synchronizing the local clocks of the plurality of locationing transceivers based on a cross calibration with at least one reference transceiver at a known location by:
        receiving a plurality of RF beacon packets from the at least one reference transceiver, wherein the RF beacon packets are time stamped with their time of arrival from the plurality of locationing transceivers along with a packet identifier number;
        communicating periodically by each of the plurality of locationing transceivers to an infrastructure device a list of the time stamped RF beacon packets received by the locationing transceivers; and
        correlating the local arrival times of each RF beacon packet based on the known spatial location of the at least one reference transceiver and locationing transceivers.

3. The method of claim 2, wherein the plurality of RF beacon packets are transmitted during specific time intervals, to the plurality of locationing transceivers, wherein the time intervals are shorter than a minimal time interval necessary for correcting the drift time of the local clocks in the locationing transceivers.

4. The method of claim 2,
    interpolating the correlation among the plurality of local clocks between the arrival of successive RF beacon packets.

5. The method of claim 4, wherein the interpolating the correlation among the plurality of local clocks comprises:
    linearly interpolating the correlation among the plurality of local clocks between the arrival of successive RF beacon packets.

6. The method of claim 2, wherein the locationing transceivers are placed at an equal distance from the at least one reference transceiver, and wherein receiving includes receiving the RF beacon packet from the at least one reference transceiver at substantially the same time instant, differing only by the unsynchronized timing of the local clocks of the locationing transceivers, and wherein the correlating step includes equating the local clocks of all locationing transceivers to the local clock of one of the locationing transceivers.

7. At least one locationing transceiver operable for locationing an object in a communication network, the at least one locationing transceiver comprising:
    a receiver at a known location, coupled to an antenna, and configured to receive from a wireless transceiver fixed to the object of unknown location a radio frequency (RF) packet;
    a local clock operable to provide timing information;
    a processor coupled to the receiver and local clock and operable to determine the local time of arrival of the RF packet, and place a time stamp on the received RF packet based on the local time of arrival and the local clock along with a packet identifier number; and
    a transmitter coupled to the processor and operable to communicate to an infrastructure device a list of time stamped and identified RF packets such that the infrastructure device can correlate the time stamps for each identified RF packet across all locationing transceivers, and determine a spatial location of the object using a differential time-of-arrival triangulation.

* * * * *

UNITED STATES PATENT AND TRADEMARK OFFICE
CERTIFICATE OF CORRECTION

| | | |
|---|---|---|
| PATENT NO. | : 8,121,110 B2 | Page 1 of 1 |
| APPLICATION NO. | : 12/270319 | |
| DATED | : February 21, 2012 | |
| INVENTOR(S) | : Pisharody | |

It is certified that error appears in the above-identified patent and that said Letters Patent is hereby corrected as shown below:

In Column 1, Line 37, delete "network" and insert -- network. --, therefor.

In Column 5, Line 10, delete "124," and insert -- 142, --, therefor.

In Column 7, Line 41, in Claim 1, delete "number,;" and insert -- number; --, therefor.

In Column 8, Line 17, in Claim 4, delete "claim 2," and insert -- claim 2, further comprising: --, therefor.

Signed and Sealed this
Eighteenth Day of December, 2012

David J. Kappos
*Director of the United States Patent and Trademark Office*